Sept. 22, 1931.    G. HAZELTON    1,823,898
FASTENING INSERTING MACHINE
Filed Sept. 17, 1929    3 Sheets-Sheet 3

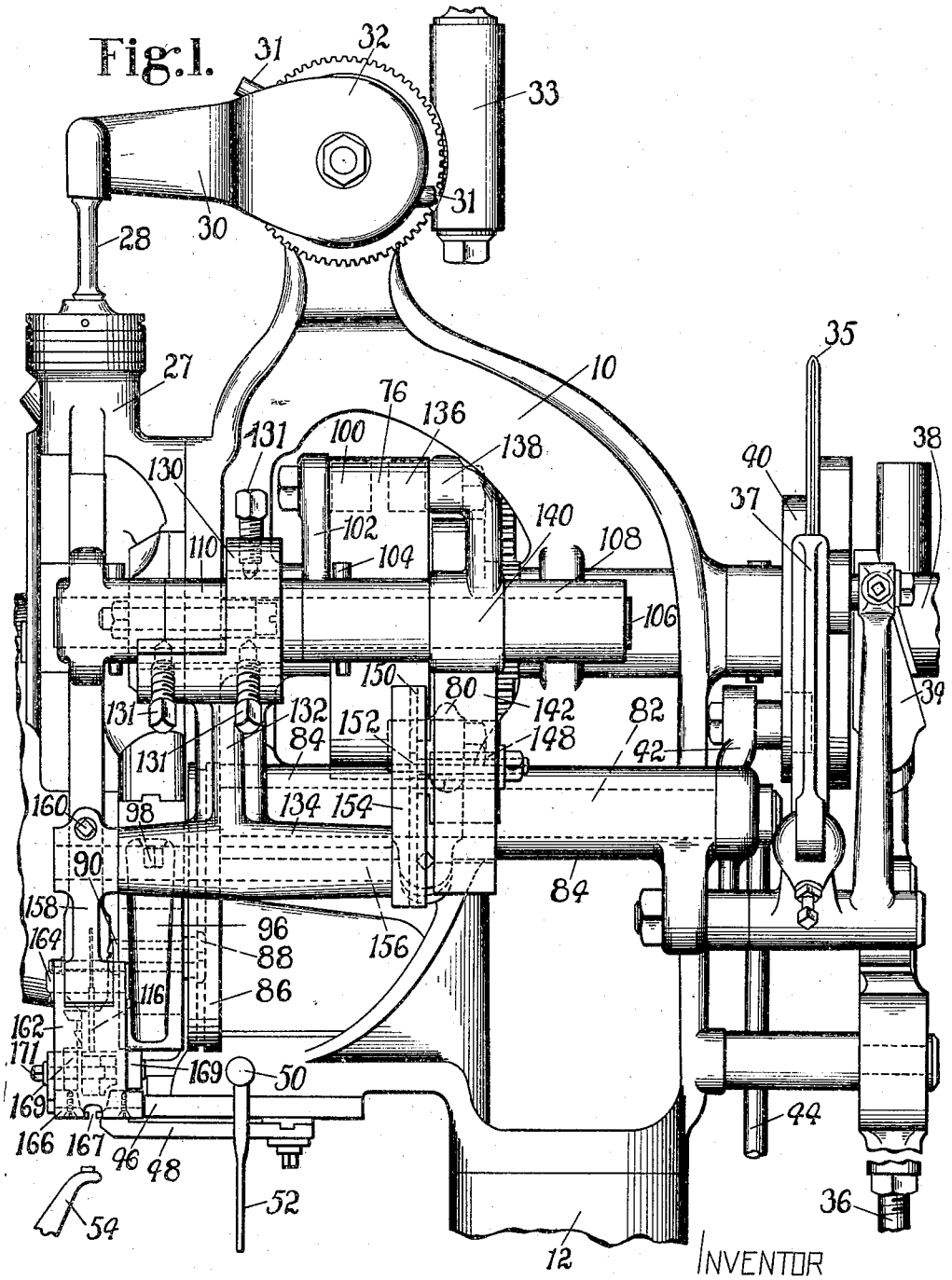

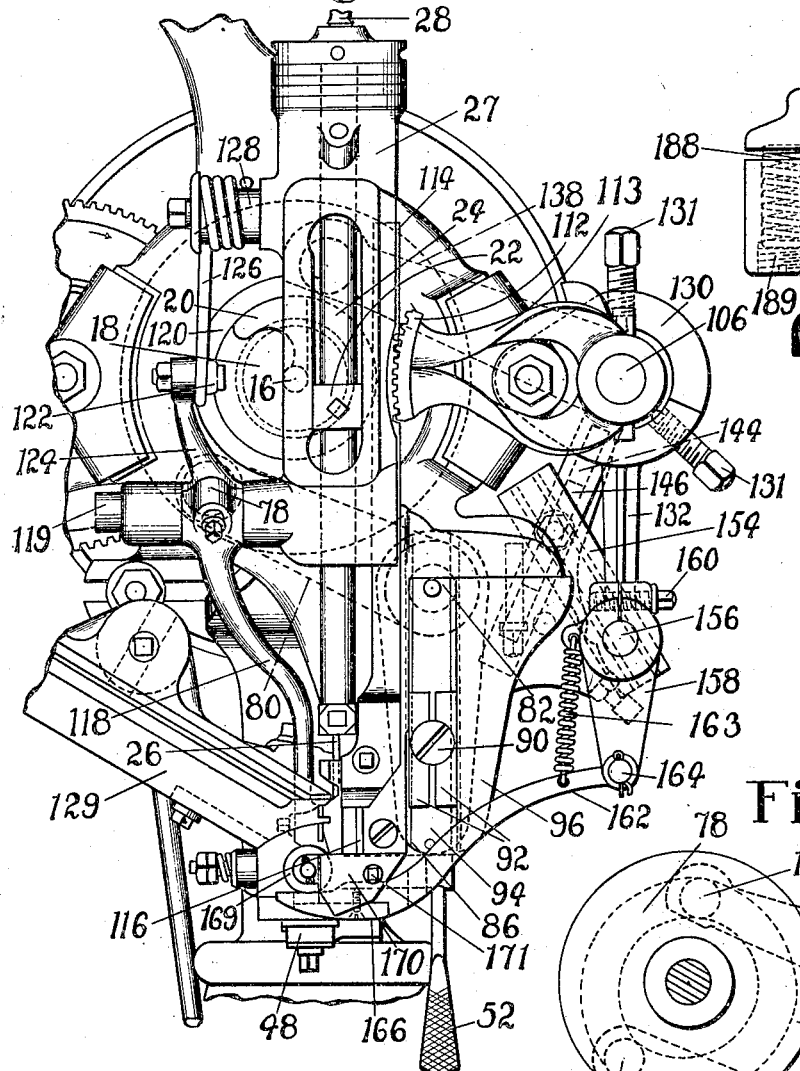
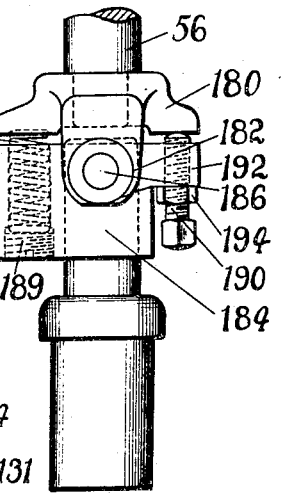
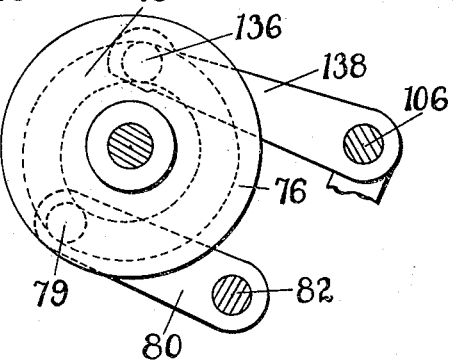
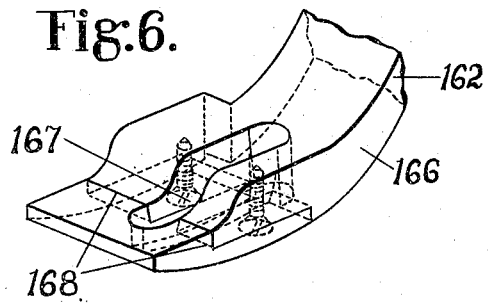

INVENTOR
George Hazelton
By his Attorney,
Nelson W. Howard

Patented Sept. 22, 1931

1,823,898

UNITED STATES PATENT OFFICE

GEORGE HAZELTON, OF LEICESTER, ENGLAND, ASSIGNOR TO UNITED SHOE MACHINERY CORPORATION, OF PATERSON, NEW JERSEY, A CORPORATION OF NEW JERSEY

FASTENING INSERTING MACHINE

Application filed September 17, 1929, Serial No. 393,285, and in Great Britain September 26, 1928.

This invention relates to improvements in fastening inserting machines and is illustrated herein as embodied in a machine for inserting unconnected fastenings such as nails, to secure together shoe parts.

As viewed in its broad aspects, the general object of the invention is to provide a machine for inserting driven fastenings with means for continuously feeding the work to the fastening inserting mechanism.

More particularly the invention aims to provide means for operating in timed relation to the usual feed of a fastening inserting machine to feed the work continuously to the fastening inserting mechanism.

In machines for inserting nails in the manufacture of shoes the work is commonly fed step by step to fastening inserting mechanism by an awl which pierces the work. The main shaft of the machine revolves at a speed of approximately 350 to 550 revolutions per minute and during each revolution of the main shaft the machine operates to feed the work and to insert a fastening. It is readily appreciated that the rapid starting and stopping of the work produces vibration, which is transmitted to and tends to tire the operator of the machine. Accordingly, an object of this invention is to provide means whereby the vibration of the machine due to feeding the work is substantially reduced. To this end a feature of the invention resides in improved means constructed and arranged to feed work continuously to the fastening inserting mechanism.

A further feature of the invention is a feeding member which co-operates with the usual feed of a machine for inserting unconnected fastenings arranged to feed the work continuously to the fastening inserting mechanism.

Another feature of the invention resides in a feeding member operated in timed relation to the awl of a machine for inserting separate fastenings by the same cam which operates the awl.

The illustrated machine is provided with an underplate which presses the work against the horn of the machine during a portion of the feeding movement. The resulting pressure produces a tendency to drag or interfere with the feeding of the work. Accordingly, another object of the invention is to provide means for overcoming this drag. To this end a feature of the invention comprises an improved work support or horn mounted for movement in the line of feed of the machine.

Another object of the invention is to provide means for returning the horn to its initial position after it has completed its movement in the line of feed. A feature of the invention therefore resides in a horn provided with a spring constructed and arranged to return the horn to a vertical position when it is displaced therefrom.

These and other objects and features of the present invention will appear from the following detailed description read in connection with the accompanying drawings and the novel features of the invention will be defined in the claims. It is to be understood that although the preferred embodiment of the invention is herein described as being especially designed for use in a nailing machine, it is, nevertheless, apparent that this invention could be used in connection with other types of fastening inserting machines such as, for example, machines for inserting staples, pegs or slugs, such fastenings being either metallic or non-metallic.

Fig. 1 is a view in side elevation of the head of a fastening inserting machine embodying the invention;

Fig. 2 is a front elevational view of a portion of the head of the machine;

Fig. 3 is a front elevation of the feed cam;

Fig. 4 is a detailed view of the horn carrier;

Fig. 6 is a perspective view of the under feed plate; and

Figure 7:
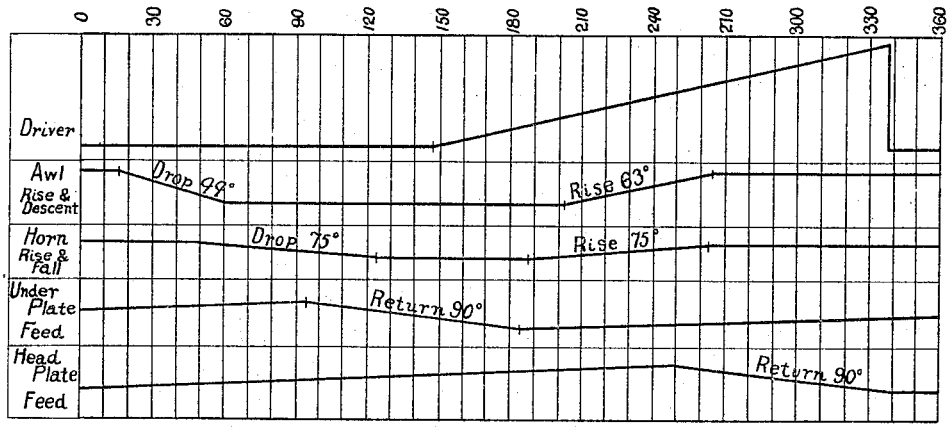
Fig. 7 is a timing diagram.
Figure 5:
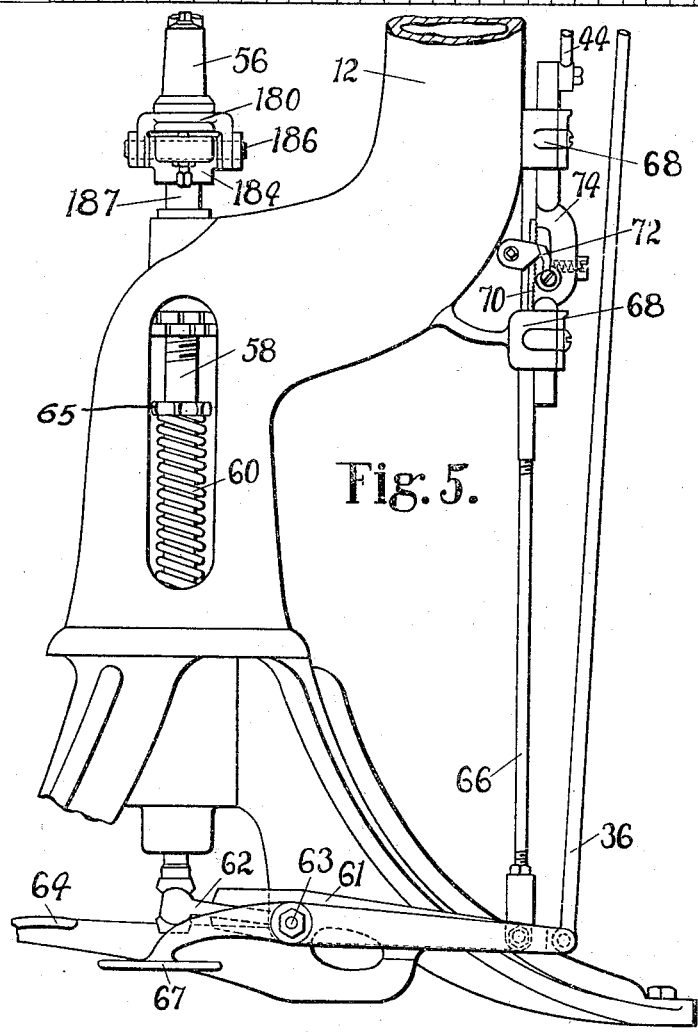
Fig. 5 is a side elevation of the mechanism operating the horn.

The illustrated machine embodying the invention is of the type disclosed in United States Letters Patent No. 490,624, granted January 24, 1893 on an application of Louis Goddu for improvements in nailing machines for use in the manufacture of boots and shoes.

In the illustrated machine embodying the invention, a head 10 is mounted on a standard 12. The head 10 has bearings for a suitable drive shaft 16 upon the front end of which is mounted a disk 18 having a cam surface 20 which in the rotation of the machine acts on a projection or lug 22 attached to a driver bar 24, provided at its lower end with a driver 26. The driver bar is mounted in the movable head 27 which is adapted to be oscillated during the operation of the machine as is usual in machines of this type. The upper end of the driver bar has ball-jointed to it a link 28 connected to a lever 30 to which a spiral spring 31 (Fig. 1) is secured, the latter serving to throw the driver bar down quickly when the cam 20 passes the lug or projection 22.

The machine is also provided with a brake slide 35, a brake 37 and a suitable clutch pulley (not shown) which is controlled in the usual manner by a wedge 34 fast on a rod 36 substantially as described in the above-mentioned Letters Patent.

Secured to the shaft 16 is a cam 40 having a suitable cam groove in its forward face in which enters a cam roll attached to a lever 42 which in turn is secured to a rod 44. The rod 44 is secured to a horn depressing lever 61 having its fulcrum at 63 and connected by means of a ball and socket joint 62 to the lower end of a horn shaft 58, having at its upper end a horn 54. The horn shaft 58 has a collar 65, which rests upon a strong spiral spring 60, the normal tendency of which is to lift the horn against the work as soon as the feed in completed. The horn is pulled down positively and to a uniform distance below the under side of the work after driving each fastening, while the awl is feeding the work, by means of a pawl 72 pivoted to a pawl carrier 74, sliding in guides 68, and connected with the rod 44 which is connected to the cam lever 42. The carrier 74 is lifted once during each revolution of the shaft 16, just after the driver 26 has descended and while the work is fed by the awl 116 and the swinging movement of the head 27. As the carrier 74 is raised, the pawl 72 engages a tooth of the rack 70, connected by a rod 66 with the horn depressing lever 61 and depresses the horn 54. The pawl 72 is disengaged from the teeth of the rack 70 when the carrier 74 is depressed by the action of the cam 40 on the cam lever 42. The spring 60 then acts to throw the upper end of the horn 54 up against the under side of the work, notwithstanding variations in the thickness of the work.

A cam 76 is mounted upon the main shaft 16 of the machine and actuates levers which are arranged to impart feeding movement to the work. On the rear face of the cam 76 is a cam groove 78 in which enters a roller 79 fixed to an arm 80 which is fixed to a shaft 82 journaled in bearings 84 forming part of the head 10. Secured to the forward end of the rock shaft 82 is a feed arm 86 grooved at its front face at 94 to receive the foot of a hollow stud 88 mounted to slide in the groove 94, the stud having secured into and through it a stud-screw 90, the inner end of which meets the arm 86. The stud is embraced loosely by a pair of blocks 92, the flat faces of which enter and slide in a slot 94 formed between a part of the oscillating head 27 and a finger 96, the latter being adjustably secured to the oscillating head by a set screw 98. As will be seen from the foregoing description, the rotation of the cam 76 imparts a feeding movement to the awl 116 in substantially the same manner as described in Letters Patent No. 490,624 above referred to.

Formed in the front side of the cam 76 is a cam groove receiving a cam roller 100 secured to one end of a rocker arm 102 which in turn is pinned to the rock shaft 106 by means of a pin 104. The rock shaft 106 is mounted in suitable bearings 108 and 110 in the head 10 of the machine. The toothed segment 112 is secured to the rock shaft 106 by means of an arm 113. The segment 112 engages teeth on the awl bar 114 which is provided at its lower end with a suitable awl 116. The segment 112 when oscillated about the shaft 106 causes the rise and fall of the awl in a manner to pierce the work preparatory to the feeding operation.

As is usual in machines of this type, a separator arm 118 is mounted for oscillation about a shaft 119 fixed to suitable bearings in the movable head 27 of the machine. The arm 118 is provided at its upper end 124 with a roll 122 which engages the cam surface 120 formed on the outer edge of the cam disk 18. The upper arm 124 is held against the cam surface 120 by means of a spring 126 which is secured to the machine at 128 (Fig. 1). The separator operates between the last two nails in the nail raceway 129 to deliver one nail at a time into the passage receiving the driver bar 26.

The construction and operation of the parts above referred to is substantially the same as that disclosed in the Letters Patent above mentioned and also as disclosed in United States Letters Patent No. 265,227, granted September 26, 1882, on the application of Louis Goddu which relates more particularly to the horn release mechanism, to which reference may be had for a more detailed description of the construction and operation of the parts above described.

A support 130 is secured to the forward bearing 110 of the rock shaft 106 and is rigidly held in place by means of three set screws 131. This support carries mechanism cooperating with the awl 116 to feed the work continuously. The lower portion of the support 130 is extended to form a bracket arm 132 which is provided at its lower end with a bearing 134 in which is journaled a shaft 156 connected to the cam groove 78 by a system of levers which will later be described.

To provide means acting in timed relation to the feeding movement of the awl 116, the cam groove 78 receives a cam roller 136 to which is secured the upper end of the arm 138 of a bell crank lever loosely pivoted about the rock shaft 106. The lower arm 142 of the bell crank lever is provided with a groove 144 in which a block 146 is adjustably secured in position by means of a hollow stud 148 through which is journaled a bolt having a head 152 which enters a groove 150 formed in the rear face of the lever arm 154. The lower end of the lever arm 154 is fixed to a shaft 156 which is journaled in the bearing 134 carried by a bracket arm 132 of the supporting member 130. Secured to the front end of the rock shaft 156 is a lever arm 158 clamped to the rock shaft 156 by means of a clamping screw 160. The free end of the lever 158 is pivotally connected to the arm 162 of the under plate feed 166 by means of a pin 164 journaled through the members 158 and 162. The under plate 166 is provided with a longitudinal groove 167 through which the driver 26 and the awl 116 operate. The feed member 166 is provided at its upper face with bearing surfaces for the rollers 169. The under surface of the under plate 166 may be serrated so as to feed the work more positively. A spring 163 secured at one end to a lug on the arm 158 and secured to the under plate feed arm 162 holds the under plate 166 against the throat of the machine.

The pressure of the horn 54 against the under plate feed 166 produces a thrust on the throat of the machine and in order to reduce the friction between the upper surface of the under plate feed 166 and the throat piece rollers 169 are provided. A plate 170 is secured to the movable head 27 of the machine by means of a screw 171 and the rollers 169 are journaled in the forward end portion of the plate 170. To insure that the under plate 166 is kept or guided in alinement with the awl 116 and the driver 26, the plate 170 is extended downwardly to overlap the forward edge of the under plate 166. The rear surface of the under plate 166 is guided by means of a flat plate 46.

The two cam rollers 79 and 136 engage the cam at points spaced from each other approximately 155 degrees and, as a consequence, each feeding instrumentality, namely the awl 116 and the under plate 166, is operated to feed the work forward during three-quarters of each machine cycle, each member returning during one-quarter of the cycle while the other is feeding the work forward. The awl 116 descends almost at the beginning of the cycle and is fully down when 50° of the cycle have occurred. After approximately one-quarter of the cycle the under plate 166 reaches the limit of its forward movement and returns during 90° of the cycle. The feed by the awl continues throughout and beyond the period that the under plate is returning. During the time that the awl 116 alone is feeding the work, the horn 54 is depressed as above described. The awl 116 continues to feed the work and is lifted clear of the work when the machine has completed a little more than two-thirds of its cycle and at this time the return movement of the head 27 and the awl 116 is begun, finishing just before the machine is at the end of its cycle. The horn 54, during the last part of the cycle, is again raised into contact with the lower surface of the work.

From the above, it is readily understood that the under plate feeds the work during part of its movement while the horn is raised and bearing against the under surface of the work. The pressure of the horn against the work tends to drag and to interfere with the feeding of the work and to overcome this drag, the horn 54 is mounted on a carrier 180 which is pivotally mounted for movement in the direction of the feeding movement of the under plate 166 and awl 116. The carrier 180 is pivotally secured by depending lugs 182 to a co-operating member 184 mounted on the horn post by means of a pin 186. The horn is caused to return to a substantially vertical position, when the horn 54 is depressed, by means of a spring 188 which is adjustably secured in the member 184 by means of an adjusting screw 189. The position of the horn may be adjusted to compensate for wear of the moving parts of the horn by means of a set screw 190 which is threaded through a hole in the flange 192 of the member 184 and the screw 190 is locked in position by means of lock nut 194.

The operation and construction of the illustrated machine has been fully described above but it is believed that it would be advantageous to summarize briefly the operation of the machine.

The operator by depressing the treadle 64 causes the horn 54 to be lowered from its normal position below the under plate feed 166. A shoe or other article to be operated upon is placed upon the horn and the pressure on the treadle 64 is released. The operator then depresses the treadle 67 causing the wedge 34 to act upon the loose pulleys above referred to, thus setting the machine into operation. The horn 54 is held in raised position during the first part of the cycle of the machine and when approximately 50° of the cycle has been completed it drops to a lower position. Meanwhile the under plate and the awl 116 have been feeding the work. After approximately 90° of the cycle has been completed, the under plate 166 reaches the limit of its forward movement and returns during the next 90° of the cycle. The awl, however, continues its feeding movement during and beyond the return movement of the under plate feed. The awl 116 drops to pierce the work shortly after the beginning of the cycle and remains in the work during the feeding movement of the awl. When the awl is withdrawn from the work after substantially 265° of the cycle has been completed, the horn returns to its raised position and presses against the under side of the work. The under plate 166, after its return movement, operates to feed the work through the remainder of the cycle and, as above stated, the pressure of the horn on the work creates a drag and to overcome this drag the horn 54 is caused to move in the line of feed for the remainder of the cycle. At approximately the end of the cycle, the driver 26 drops and drives a fastening. The machine may be stopped at the end of any cycle by releasing the pressure on the treadle 67 which causes the brake shoe 37 to engage the disk 35 which stops the machine.

Having thus described my invention, what I claim as new and desire to secure by Letters Patent of the United States is:

1. In a machine for inserting driven fastenings, a driver, a cam, an awl operated by the cam and arranged for movement to feed work to the driver, and means operated by the cam for feeding the work when the awl is in inoperative position and arranged to continue the feed of the work in the same direction as it is fed by the awl.

2. In a fastening inserting machine, a driver, a member constructed and arranged for movement to feed the work intermittently, means for imparting feeding movement to the member, and means operating in timed relation to the member to feed the work to the driver between the work-feeding movements of the member, the last-mentioned means being operated by the first-mentioned means to continue the feed of the work in the same direction as it is fed by the member to the driver.

3. In a fastening inserting machine, a driver, an awl, means constructed and arranged to cause the awl intermittently to feed work to the driver, and means co-operating with the awl to cause the work to be fed continuously to the driver.

4. In a fastening inserting machine, a driver, a drive shaft, a cam mounted on the drive shaft, and a plurality of successively acting work feeding means, said means comprising an awl operated by the cam mounted on the drive shaft of the machine, and a member operated by the cam, said awl and member acting successively to feed the work continuously to the driver.

5. In a fastening inserting machine, an awl, a driver, a shaft for operating the driver, a cam mounted on the shaft, a lever operated by the cam to impart a work feeding movement to the awl, an underplate, and a second lever operated by the cam to apply feeding movement to an underplate, said awl and said underplate acting to feed the work continuously to the driver.

6. In a machine for inserting driven fastenings, a drive shaft, a tool operated by the shaft, a cam mounted on the drive shaft, an awl, means connecting the awl to said cam, said means acting to apply feeding movement to the awl, and a cooperating feeding member connected to the cam and acting to feed the work in timed relation to the feeding movement of the awl and arranged to continue the feed of the work in the same direction as it is fed by the awl to the driver.

7. A machine for inserting driven fastenings having, in combination, mechanism for inserting a driven fastening, an awl constructed and arranged to feed work to the fastening inserting mechanism, and means cooperating with said awl to cause the work to be fed continuously to the inserting mechanism.

8. In a loose nailing machine, a nail inserting mechanism, an awl constructed and arranged to feed the work to the nail inserting mechanism, and means co-operating with said awl to cause the work to be fed continuously to the inserting mechanism.

9. In a machine for inserting fastenings, fastening inserting mechanism, a raceway constructed and arranged to deliver separate fastenings to the inserting mechanism, an awl constructed and arranged to feed the work to the fastening inserting mechanism, and means co-operating with said awl to cause the work to be fed continuously to the inserting mechanism.

10. In a machine for inserting fastenings, a swinging head, a fastening inserting mechanism mounted on the swinging head, an awl constructed and arranged to feed the work to the fastening inserting mechanism, and means co-operating with the awl to cause the work to be fed continuously to the inserting mechanism.

11. In a machine for inserting fastenings, a swinging head, a fastening inserting mechanism mounted on the swinging head, a drive shaft, a cam mounted on the drive shaft, an awl connected to the cam to feed work intermittently to the fastening inserting mechanism, and an underplate connected to the cam and cooperating with the awl to cause the work to be fed continuously to the fastening inserting means.

12. In a machine for inserting fastenings, a swinging head, fastening inserting mechanism mounted on the swinging head, a driver, a member constructed and arranged for movement to feed the work intermittently, and means operating in timed relation to the member to feed the work to the driver between the work feeding movements of the member.

13. In a fastening inserting machine, a swinging head, a driver mounted on the swinging head, a drive shaft, a cam mounted on the drive shaft, and a plurality of successively acting work feeding means, said means comprising an awl operated by the cam and a member operated by the cam, said awl and said member being mounted on the swinging head and acting successively to feed the work continuously to the driver.

14. In a machine for inserting fastenings, a main shaft, a fastening inserting mechanism, a cam mounted on the main shaft, an awl, an underplate, and means connecting the awl and the underplate to the cam constructed and arranged to cause the awl and the underplate to cooperate to feed work continuously to the fastening inserting mechanism.

15. In a nailing machine, a drive shaft, a nail inserting mechanism, a cam mounted on the drive shaft, an awl connected to the cam to feed work intermittently to the nail inserting mechanism, and an underplate connected to the cam and cooperating with the awl to cause the work to be fed continuously to the nail inserting mechanism.

16. In a machine for inserting metallic fastenings, an operating tool, a drive shaft, means connecting the operating tool to the drive shaft, a cam mounted on the drive shaft, an awl connected to the cam by a pair of lever arms, said cam and lever arms imparting feeding movement to the awl, an underplate, and means connecting the underplate to the cam, the awl and underpla'e being constructed and arranged to feed work continuously to the operating tool.

17. In a machine for inserting fastenings, a fastening inserting mechanism, a main shaft, a cam mounted on the main shaft, an awl, means connecting the awl to the cam and arranged to feed work intermittently to and past the fastening inserting mechanism, a bracket mounted on the machine, a rock shaft mounted on said bracket, a pair of rocker arms secured to the rock shaft, means connecting one of the rocker arms to the cam, and an underplate connected to the other rocker arm, said underplate acting to feed the work in timed relation to the feeding movement of the awl to cause the work to be fed continuously.

18. In a nailing machine, means for feeding work continuously to a nail inserting mechanism, said means comprising a cam, an awl, an underplate, a lever having a cam roller at one end engaging the cam and the other end of the lever being fixed to a rock shaft, a second lever fixed at one end to the rock shaft and the other end of the second lever being slidably connected to the awl, a bell crank lever rotatably mounted on a shaft, one arm of the bell crank lever having a cam roller fixed thereon and engaging the cam at a point spaced from the point at which the first mentioned cam roller engages the cam, the other arm of the bell-crank lever being slidably connected to a hird lever, said third lever being secured to a second rock shaft, a fourth lever secured at one end to the second rock shaft, and an underplate secured to the other end of the fourth lever, whereby said awl and said underplate operate in timed relation to each other to feed work continuously to the nail inserting mechanism.

19. In a work support for a fastening inserting machine, a horn, a horn post, means connecting the horn to the horn post to allow the horn to partake of transverse movement only in the line of feed of the machine, means for returning the horn to its original position, and means operating as a stop when the horn is returned to its original position.

20. In a work support for a fastening inserting machine, a horn, a horn post, a carrier for the horn, means for pivotally connecting the carrier to the horn post to allow the horn to partake of movement in the line of feed of the machine, and means acting as a stop for the carrier when the horn is returned to its original position.

21. A work support for a fastening inserting machine having, in combination, a horn, a horn post, a carrier for the horn, a co-operating member secured to the horn post, a pin connecting the carrier and the co-operating member to allow the horn to move in the line of feed of the machine, a spring for returning the horn to a vertical position after the feeding movement has been completed, and an adjustable member operating as a stop for the carrier when the horn is returned to its original position.

22. In a fastening inserting machine, a driver, a cam, cooperating members operated by the cam to feed work continuously to the driver, and a work support pivotally mounted to partake of movement in the line of feed of the machine.

23. In a fastening inserting machine, a driver, a plurality of successively operated work feeding members, a work support pivotally mounted for movement in the line of feed of the machine, and means for returning the work support to a vertical position.

24. A work support for a fastening inserting machine having, in combination, a horn, a horn post, a carrier for the horn, a co-operating member secured to the horn post, a pin connecting the carrier and the co-operating member to permit the horn to move in the line of feed of the machine, a spring mounted in the co-operating member arranged to return the horn to a vertical position, and means on the co-operating member operating as an adjustable stop for the carrier when returned to its vertical position.

In testimony whereof I have signed my name to this specification.

GEORGE HAZELTON.